UNITED STATES PATENT OFFICE.

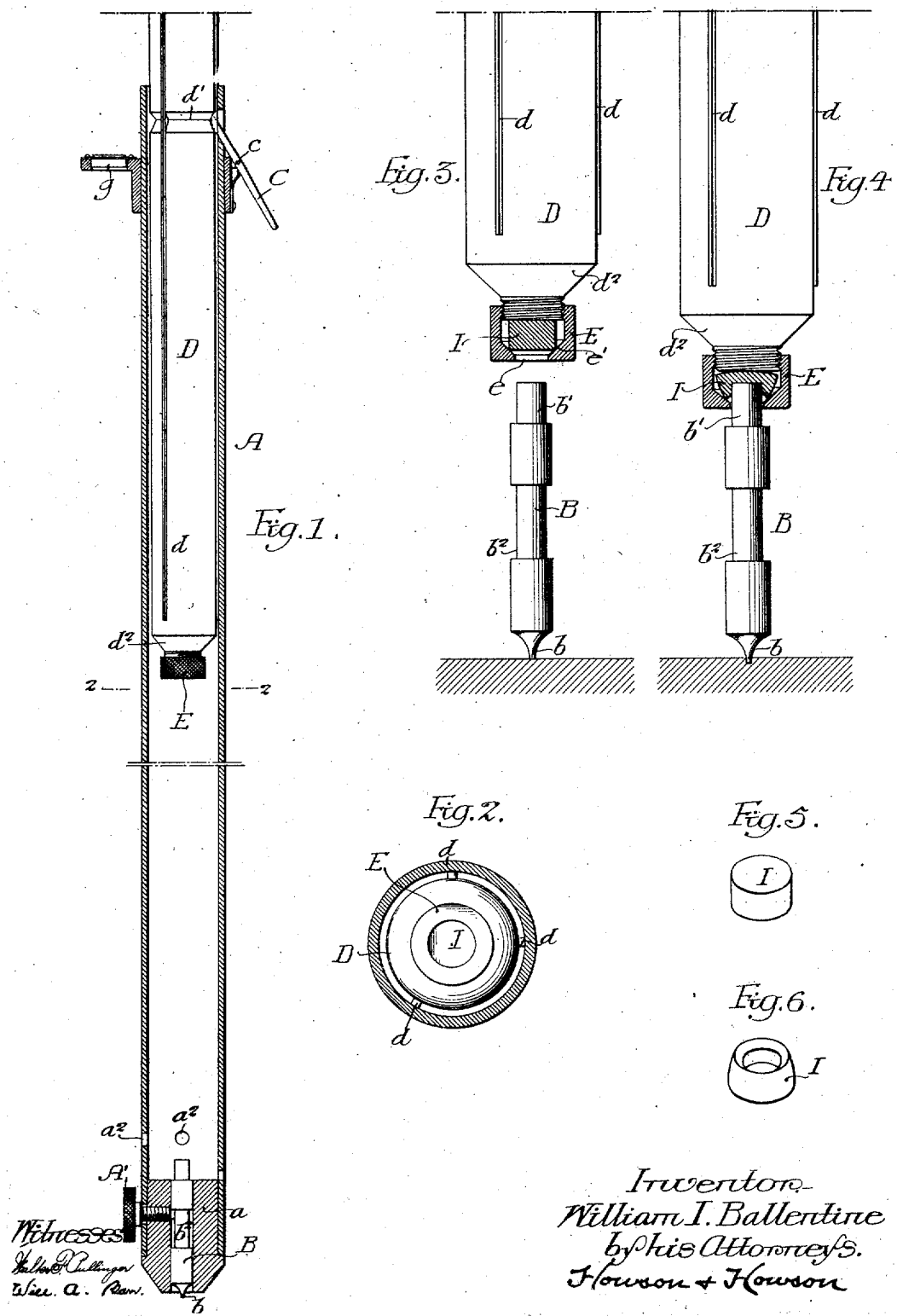

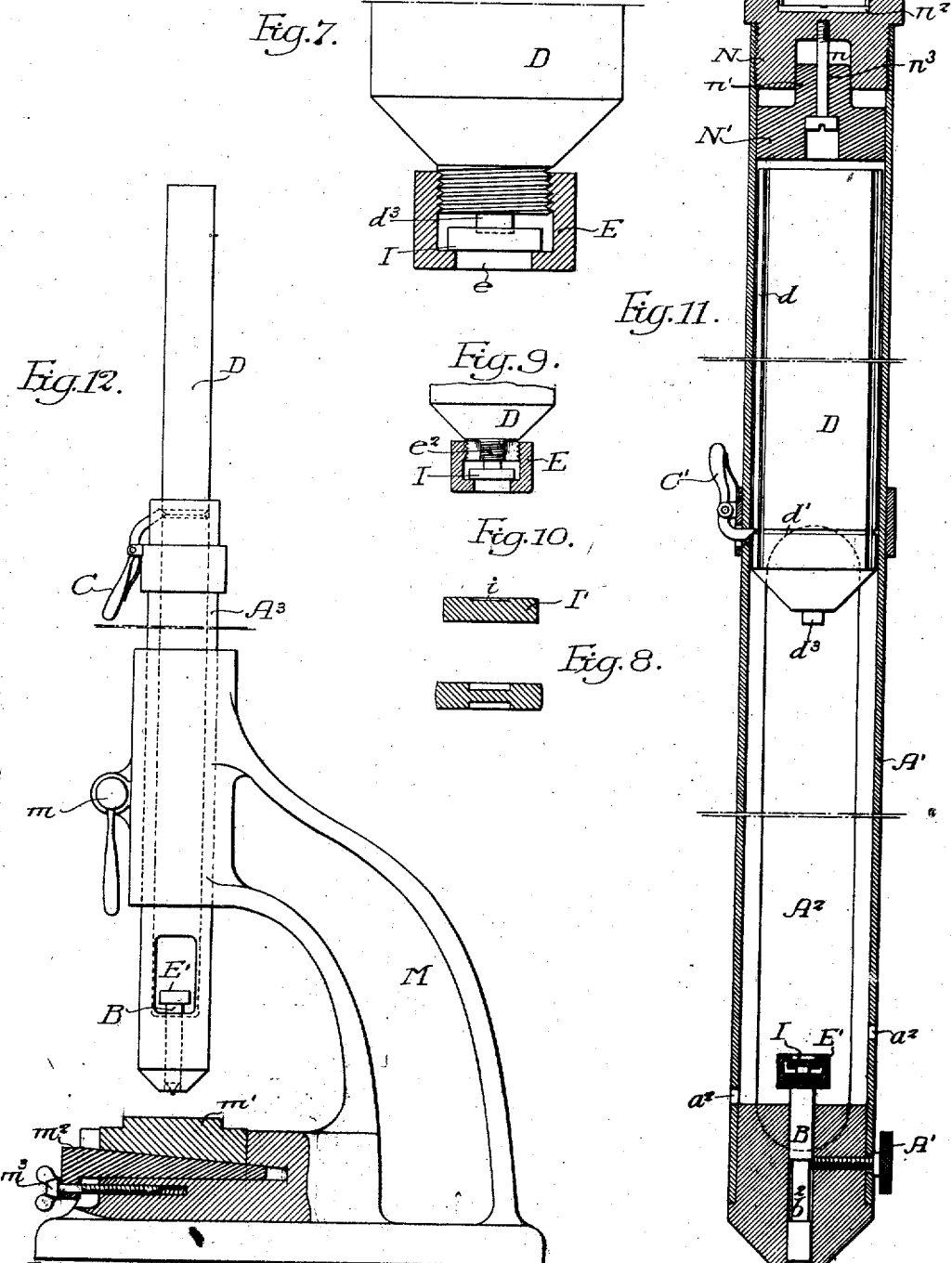

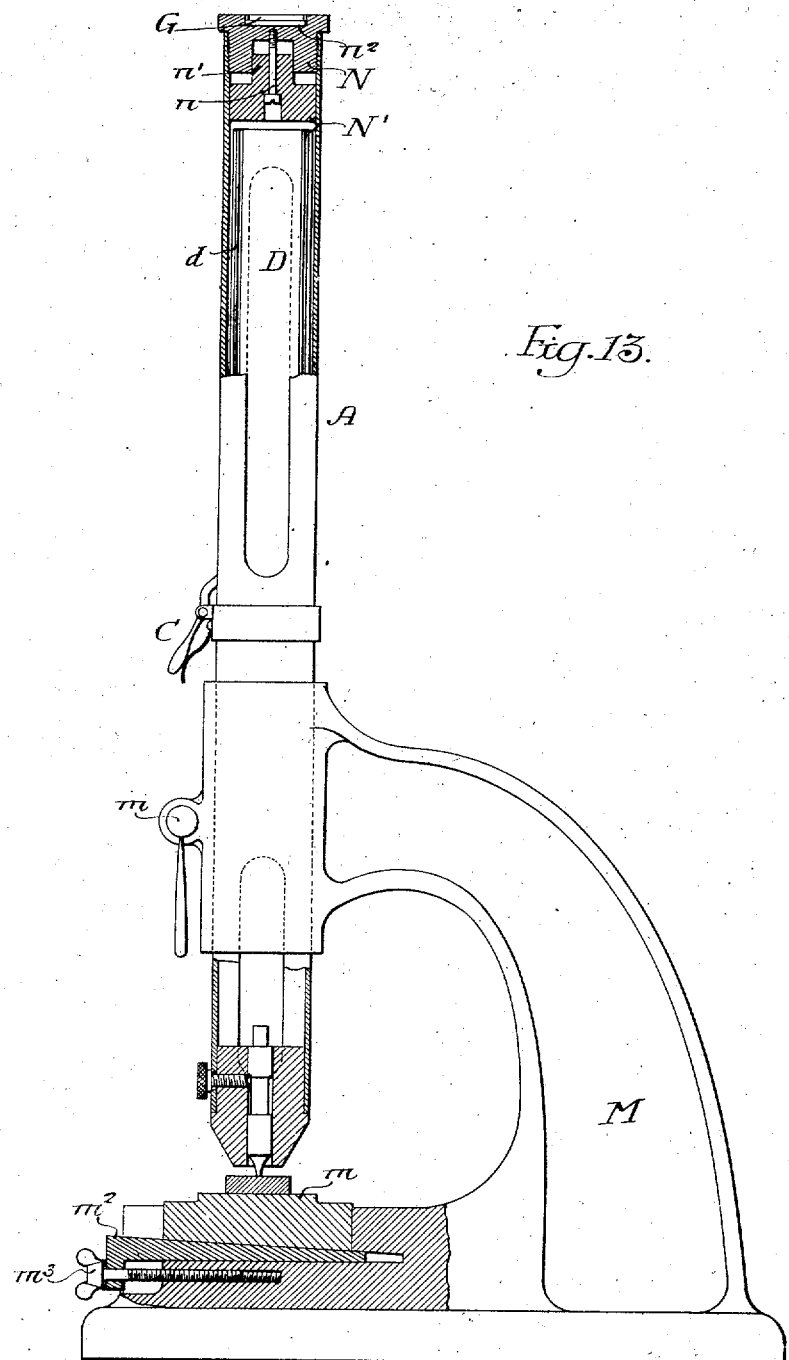

WILLIAM I. BALLENTINE, OF PHILADELPHIA, PENNSYLVANIA.

TESTING APPARATUS.

No. 881,047.

Specification of Letters Patent.

Patented March 3, 1908.

Application filed April 26, 1907. Serial No. 370,488.

*To all whom it may concern:*

Be it known that I, WILLIAM I. BALLENTINE, a citizen of the United States, residing in Philadelphia, Pennsylvania, have invented certain Improvements in Testing Apparatus, of which the following is a specification.

The object of my invention is to construct an apparatus for testing the hardness and density of metals and other materials and for carrying out the process for which Letters Patent were applied for by me on the 18th day of October, 1906, Serial No. 339,441.

The usual practice of testing the hardness and density of metal is to press a ball into the metal to be tested by the exertion on said ball of a definite force, after which the depth of the impression made is measured. This method however, is unsatisfactory and to a certain extent uncertain, as in most cases a test has also to be made on a separate test piece of the metal, and, furthermore, the testing machine is not portable, so that it is difficult to make a test of a large casting or forging.

By the use of my invention an impression is made by a definite force on a blank, preferably of a softer metal than the metal being tested, and this blank is then calipered. The test can be made on the metal at any point desired, as the device is portable and moreover the test will not injure or disfigure the metal being tested.

In the accompanying drawings:—Figure 1, is a vertical sectional view of my improved testing device; Fig. 2, is an enlarged horizontal section on the line 2—2, Fig. 1; Fig. 3, is a diagrammatic view, showing the relation of the punch plunger and test disk before the device is used; Fig. 4, is a view similar to Fig. 3, after the device has been employed to test the hardness of a piece of material; Fig. 5, is a perspective view of a test disk before it has been acted upon by the punch; Fig. 6, is a perspective view of the disk after being acted upon by the punch; Fig. 7, is a view of a modification showing the cap in section; Fig. 8, is a view showing the test piece after being compressed by the plunger illustrated in Fig. 7; Fig. 9, is a vertical section showing a modification of the means for attaching the cap to the plunger; Fig. 10, is a vertical section of the preferred form of test disk; Fig. 11, is a vertical section illustrating a modification of the device shown in Fig. 1, Fig. 12, is a side elevation of a form of my invention which may be used in laboratory work, and Fig. 13, is a side elevation, partly in vertical section, illustrating a form of my invention embodying in one device certain features illustrated in several of the other figures.

Referring to the above drawings, A is the tubular guide, which may be of any length desired. Secured to the bottom of this guide is a block $a$, which is shaped to receive the punch B. This punch has a blunt point $b$ at one end and a flat head $b'$ at the opposite end of greater diameter than said point, there being a reduced portion $b^2$ at the center.

A' is a screw stop, which passes through the block $a$ and into the cavity for the punch, so as to strike the reduced portion thereof and limit the movement of the punch.

D is a plunger adapted to slide in the tubular guideway A and in order that it may move with the greatest freedom, it is provided with guide ribs $d$, as indicated in Fig. 2, so arranged as to leave an air space between the plunger and the guide. In the bottom of the tube are openings $a^2$ for the escape of air when the plunger descends.

C is a trigger pivoted at $c$ to the tube A, and so mounted that when the plunger is raised as in Fig. 1, its end enters an annular groove $d'$ in the plunger D. I preferably secure to one side of the tube A a spirit level $g$, in order to give indication when the tube is plumb. The lower end of the plunger D is preferably tapered, as shown at $d^2$, and has a screw threaded end.

E is a cap fitting the screw threaded end and having an opening $e$ larger in diameter than the end $b'$ of the punch B. Secured to the cap E is the test disk I of lead or other material preferably softer than the metal of the object to be tested. The cap is beveled at $e'$ so that when it is screwed down upon the disk it will center the latter on the plunger and said disk is of less diameter than the inner diameter of the cap, in order that it may be free to expend when it strikes the punch B.

In operating my improved device a chart is prepared indicating the different densities of metal corresponding to the varying amounts of compression of the disks I, which are of pure lead and of uniform thickness. I find pure lead the most satisfactory material for test pieces, as this metal runs more evenly than an alloy and consequently the indications given by it are highly accurate. If, for instance, a casting is to be tested as to its hardness and density, the punch B is placed in the tube, as indicated in Fig. 1, and the disk I is secured to the end of the plunger D which is mounted in the tube; being held in its raised position by the trigger C. The device is then placed over the portion of the casting to be tested and is plumbed so as to be in a vertical position, then the trigger is moved so as to release the plunger which drops directly onto the enlarged end B' of the punch B, thereby exerting a definite force upon it and driving the small end b of the punch into the casting a certain distance. The enlarged head b', however, embeds itself in the disk I, for a distance depending upon the nature and condition of the casting under test, the distance dropped through by the plunger being constant. If the metal is very hard the punch will make very little impression on the casting and the disk will be compressed to a greater extent than if the punch penetrated the casting to a greater depth. After withdrawing the plunger, the disk I is removed, and is then calipered to find the thickness of metal which was under compression. The thickness of the metal at the reduced portion of the test piece will give an indication when it is compared with the tables of the chart, of the nature of the casting being tested. Under conditions of operation I have found this device very accurate and as it is portable, it can be used in making any number of tests on the same piece without the necessity of readjusting the piece or operating on test pieces as has ordinarily been done hitherto.

In some instances it may be desirable to reduce the end of the plunger, as shown in Fig. 7, so as to have a projecting portion $d^3$ of the same diameter as the enlarged end $b'$ of the punch which acts upon the test disk, so that when the disk strikes the punch the disk will be compressed between the two surfaces of equal area and thereby be indented on both sides, as shown in Fig. 8.

In some instances instead of using a screw cap, as illustrated in Fig. 3, I may use other means for holding the disk in position. For example in Fig. 9, I have illustrated a construction in which an interrupted screw $e^2$ is used so that the cap which has a similar internally interrupted thread can be simply placed in position and quarter turned with the result that the threads on the cap will immediately engage the threads on the disk and hold it in position. This is substantially the equivalent of a bayonet joint, which may also be used.

In some instances instead of the cap being carried by the plunger, it may be mounted on the upper end of the punch, as shown at E' in Fig. 11, being held to the punch in any suitable manner so that when the plunger descends and comes in contact with the disk, the metal being tested will resist the plunger through the punch to impress the disk on both sides, as illustrated in Fig. 8.

In manufacturing the disks in large quantities, it is desirable to have them all of the same size but as some disks may vary slightly in the rolling and punching, I prefer to compress them by a suitable punch into the form illustrated in Fig. 10, at I' so that the center part of each disk will be exactly of the same thickness. This can be accomplished by simply indenting either one or both faces of said disk, as illustrated in said figure at $i$.

In Fig. 11, I have shown a modification in which the plunger is not removable from the tubular guide, and in order to gain access to the end of said plunger or to the end of the punch, I preferably form openings $A^2$ in the guide tube A' of any size desired, so that the disk can be placed in position and readily removed when compressed. In such a case I preferably close the upper end of the tubular guide by a cap N having a recess $n$ into which fits a piston $n'$ of a piece N' in the tube A', said piece being limited as to its movement by means of a bolt $n^2$ secured into the cap N. Other means of constructing a buffer may be resorted to without departing from the essential features of the invention, since it is obvious that a spring may be used to attain the end secured by the use of the dash pot illustrated. In this instance the spirit level G may be mounted in a recess $n^2$ in the cap.

Instead of placing the trigger at the upper end of the tubular guide, as illustrated in Fig. 1, it may be placed as illustrated at C' so as to engage the plunger near its lower end, without departing from the essential features of my invention.

In Fig. 12, I have shown a modification of my invention which may be used in a fixed position and is particularly adapted to operate on test pieces under the conditions found in laboratory work. In this instance the tubular guide $A^3$ is supported by a frame M, being adjustable vertically therein and held in any desired position by means of a clamping device $m$. I also provide an adjustable anvil $m'$ which may be raised or lowered by means of a wedge $m^2$ provided with an adjusting screw $m^3$. In this construction the pieces to be tested are adjusted upon the anvil $m'$ to the proper position in respect to the punch, and as before described, the disk can be carried either by the plunger, as illustrated in Fig. 1, or may simply rest upon the upper end of the punch, as illustrated in Fig. 11.

I claim:—

1. The combination of a tubular guide, a plunger mounted in the guide, means for holding a test piece on the end of the plunger, and a punch held in the guide having one end projecting so as to rest upon the piece to be tested and the other end shaped to compress the test piece carried by the plunger, substantially as described.

2. The combination in an apparatus for testing the hardness and density of materials, of a punch adapted to rest on the material to be tested, a plunger mounted above the punch, and a test disk and means for retaining the test piece between the punch and plunger so that when the plunger drops the disk will be compressed, substantially as described.

3. The combination in an apparatus for testing the hardness and density of metals, of a guide, a punch, a plunger mounted in the guide above the punch, means for retaining a test piece in position between one end of the punch and the end of the plunger, the said test piece being placed to be compressed between the plunger and the punch when the plunger is allowed to drop, substantially as described.

4. The combination of a tubular guide, a plunger mounted in the guide, a cap clamping the test piece to the plunger and having an opening, with a punch mounted in the guide and having a portion projecting so as to come in contact with the material to be tested, the other end of the punch projecting so as to enter the opening in the cap to compress the test piece, substantially as described.

5. The combination in an apparatus for testing the hardness and density of metals, a guide, a plunger in the guide, means for holding a test piece on the end of the plunger, with a punch mounted in the end of the guide and having one end arranged to project beyond the end of the plunger to penetrate the material being tested, the other end being adapted to compress the test piece, and one end being of greater surface area than the other, substantially as described.

6. The combination of a guide, a plunger mounted in the guide, means for holding a test piece to the plunger, a punch mounted in one end of the guide, said punch having a large head at one end and a reduced head at the opposite end, and means for allowing the punch to have limited movement in the guide, the larger head of the punch being adapted to act upon the test disk, substantially as described.

7. The combination of a guide, a plunger mounted in the guide, a punch mounted in one end of the guide, a projection on the plunger, and a cap for holding a test disk to the plunger, the projection on the plunger being of the same diameter as the inner end of the punch, substantially as described.

8. The combination of a guide, a plunger mounted in the guide, a punch carried by one end of the guide, means for retaining a test disk on the end of the plunger, and a trigger engaging the plunger to hold it in a raised position so that when the trigger is actuated it will release the plunger, substantially as described.

9. The combination of a guide, a punch mounted in one end of the guide, a plunger arranged to slide in the guide, and provided with an annular recess, a trigger mounted on the guide and arranged to engage the recess in the plunger, and means for securing the test piece to the plunger, substantially as described.

10. The combination of a guide, a punch mounted at one end of the guide, a plunger adapted to the guide, said plunger having a reduced portion, a cap mounted on the reduced portion, said cap having an opening and an internal beveled surface, with a test disk, said test disk being held in position on the plunger by said cap and being centered by the beveled surface of said cap, substantially as described.

11. The combination of a cylindrical guide having an opening at its lower part; a plunger mounted in the guide and having ribs so as to allow it to freely drop within the guide, a cap for retaining a test disk on the lower end of the plunger, a trigger for retaining the plunger in its raised position, and a punch mounted in the lower portion of the guide and in such a position as to enter the cap and compress the test piece, substantially as described.

12. The combination of a tubular guide, a punch mounted in the lower end of the guide, a buffer mounted in the upper end of the guide, a plunger mounted within the guide between the punch and the buffer, and means for holding a test disk so as to be acted upon by the punch and plunger, substantially as described.

13. The combination of a tubular guide, a punch mounted in the lower end of the guide and a plunger slidably operative in said guide, said guide being open at the side so that a test piece can be placed in position between the punch and the plunger without removing the plunger from the guide, substantially as described.

14. The combination of a tubular guide, a plunger therein, a punch mounted below the plunger having one portion adapted to project from the end of the tubular guide, a support for the tubular guide, an anvil, and means for securing the tubular guide to the support with a trigger mounted in the said guide and capable of engaging the plunger to hold the same in an elevated position, substantially as described.

In testimony whereof, I have signed my name to this specification, in the presence of two subscribing witnesses.

WILLIAM I. BALLENTINE.

Witnesses:
Wm. A. Barr,
Jos. H. Klein.